(12) United States Patent
Gu (10) Patent No.: US 7,122,276 B2
(45) Date of Patent: Oct. 17, 2006

(54) POUCH TYPE SECONDARY BATTERY WITH SAFETY VENT

(75) Inventor: Chang-Il Gu, Cheonan (KR)

(73) Assignee: Samsung SDI Co., Ltd., Suwon-si (KR)

( * ) Notice: Subject to any disclaimer, the term of this patent is extended or adjusted under 35 U.S.C. 154(b) by 99 days.

(21) Appl. No.: 10/601,848

(22) Filed: Jun. 24, 2003

(65) Prior Publication Data

US 2004/0038126 A1  Feb. 26, 2004

(30) Foreign Application Priority Data

Aug. 20, 2002  (KR) .............................. 2002-49208

(51) Int. Cl.
| H01M 2/02 | (2006.01) |
| H01M 6/46 | (2006.01) |
| H01M 6/12 | (2006.01) |
| H01M 2/08 | (2006.01) |
| H01M 2/12 | (2006.01) |

(52) U.S. Cl. ...................... 429/162; 429/163; 429/185; 429/176; 429/181; 429/171; 429/174; 429/57; 429/53; 429/62; 429/72

(58) Field of Classification Search ................ 429/162, 429/163, 185, 176, 181, 171, 174, 57, 53, 429/62, 72

See application file for complete search history.

(56) References Cited

U.S. PATENT DOCUMENTS 4,678,725 A  7/1987  Kikuchi et al.

6,653,018 B1 *  11/2003  Takahashi et al. .......... 429/185

OTHER PUBLICATIONS 2000-100399; Jul. 4, 2000; Japan.

* cited by examiner

Primary Examiner—Patrick Joseph Ryan
Assistant Examiner—Angela J. Martin
(74) Attorney, Agent, or Firm—Stein, McEwen & Bui, LLP (57) ABSTRACT

A pouch type secondary battery has a safety vent which prevents explosion and fire by removing a sealing mechanism of a pouch casing when the internal temperature increases due to overcharging, overdischarging or overheating, and which exhausts internal gas before explosion and fire of the battery when the internal gas pressure excessively increases due to overcharging, overdischarging or internal short-circuit. The pouch type secondary battery includes an electrode assembly having positive and negative electrode plates with a separator interposed therebetween, and positive and negative electrode terminals extending from the positive and negative electrode plates, respectively, a pouch casing having a space in which the electrode assembly is housed to be sealed, a seal portion provided at the periphery of the space, and at least one of the positive and negative electrode terminals exposed to the seal portion, and at least one opening member disposed at the seal portion and made of a resin material having a lower melting point than a melting point of the seal portion of the pouch casing.

13 Claims, 11 Drawing Sheets

POUCH TYPE SECONDARY BATTERY WITH SAFETY VENT

CROSS-REFERENCE TO RELATED APPLICATION

This application claims the priority of Korean Patent Application No.2002-49208, filed on Aug. 20, 2002, in the Korean Intellectual Property Office, the disclosure of which is incorporated herein in its entirety by reference.

BACKGROUND OF THE INVENTION

1. Field of the Invention

The present invention relates to a secondary battery, and more particularly, a pouch type secondary battery with a safety vent, which can prevent explosion and fire.

2. Description of the Related Art

Secondary batteries are generally rechargeable and can be made into a smaller size with high capacity. Typical examples of secondary batteries include nickel-metal hydride (Ni-MH) batteries and lithium (Li) secondary batteries.

Secondary batteries are classified into cylindrical batteries using a cylindrical aluminum can, rectangular batteries using a rectangular aluminum can, and pouch type batteries accommodated in a thin-film pouch type casing, according to the outer appearance of a casing.

Specifically, a pouch type battery is fabricated by encasing an electrode assembly which generates current in a pouch casing made of a flexible film material, and sealing the same. When the internal pressure of such a pouch type battery increases due to overcharge, gas is released, which may cause swelling and explosion of a battery pack. In particular, when a lithium ion battery is overcharged, decomposition of a liquid electrolyte leads to a release of gas, such as carbon dioxide or carbon monoxide, increasing the internal pressure of the battery. Also, if over-current flows through a battery due to overdischarging or short-circuit, the internal pressure and temperature of the battery increase, leading to a risk of fire, which is a serious problem from the safety point of view.

In order to ensure safety, such secondary batteries must meet temperature requirements for charge and use. Under severe use conditions, that is, when the temperature during charging/discharging or the operation temperature of a device using batteries is excessively high, the internal temperature of a battery rises, resulting in explosion and fire.

Thus, in view of safety, manufactured secondary batteries are subjected to various safety tests, including tests of safety against overcharge or forced discharge, and thermal safety tests such as high temperature storage testing, thermal shock testing or thermal exposure testing, before commercial distribution. The thermal safety tests are carried out by allowing batteries to stand under various temperature conditions for a plurality of minutes to a plurality of hours. Even under such conditions, explosion and fire do not occur in batteries meeting safety requirements. However, in extreme cases, a battery seal is removed, thus preventing explosion and fire.

Various attempts have been made to overcome such a safety problem in secondary batteries. In particular, techniques have been vigorously sought to remove internal gases of a battery by installing a safety vent on a battery pack. By way of example, Korean Patent Publication No. 98-44210 discloses a secondary battery configured to provide a separate gas outlet or check valve made of a material having a low burst resistance at a front upper end of the battery. The gas outlet is designed to be ruptured or to exhaust internal gas through the check valve when the battery is swollen due to overcharging or overdischarging. However, the necessity of providing a separate device at the upper end of the battery requires an additional process in the manufacture of batteries, deteriorating manufacturability.

U.S. Pat. No. 4,678,725 discloses that a thermally fusible portion of an electrode tap provided at the upper end of a battery ruptures, when the internal pressure rises to a predetermined level of pressure, to allow internal gas to be exhausted outside the battery. However, according to this technique, installing a separate safety vent requires modification of a battery pack, and it is necessary to manufacture a separate casing that is different from a conventional casing. Even though the conventional casing is used, since the safety vent has a unsealed portion, and a clip is placed on the unsealed portion, the burst strength of the clip must be taken into consideration for adhesion, increasing the number of processing steps and deteriorating breaking reliability.

Japanese Patent Laid-open Publication No. 2000-100399 discloses an outer film container of a polymer lithium secondary battery, wherein the outer container casing comprises thermally fusible layers adhered to each other to hermetically seal a space in which an electrode assembly is housed, and wherein a portion of the outer container casing is a breaking portion that fuses at a lower temperature than a temperature at which a non-breaking portion fuses, that is, the fusibility of the breaking portion is lowered. Accordingly, when the internal pressure of the battery is elevated to a predetermined value, the breaking portion is ruptured.

However, it is quite difficult to reduce only the fusing temperature of the breaking portion. Also, adjusting a fusible bonding force at the breaking portion is quite difficult to achieve, which is disadvantageous in view of the manufacturability and the reliability of a safety vent.

SUMMARY OF THE INVENTION

Accordingly, the invention includes a pouch type secondary battery having a safety vent which can prevent explosion and fire by simply removing a sealing mechanism of a pouch casing when the internal temperature increases due to overcharging, overdischarging or over-heating.

Also, the present invention includes a pouch type secondary battery having a safety vent which can exhaust internal gas before explosion and fire of the battery when the internal gas pressure excessively increases due to overcharging, overdischarging or internal short-circuit.

In accordance with an aspect of the present invention, a pouch type secondary battery includes an electrode assembly having positive and negative electrode plates with a separator interposed therebetween, and positive and negative electrode terminals extending from the positive and negative electrode plates, respectively, a pouch casing having a space in which the electrode assembly is housed, wherein the space is to be sealed, a seal portion located at the periphery of the space, wherein at least one of the positive and negative electrode terminals is exposed to the seal portion, and at least one opening member is disposed at the seal portion and made of a resin material having a lower melting point than the seal portion of the pouch casing.

The opening member may have a flattened first end that faces the space of the pouch casing. Also, the first end is preferably connected to an internal end of the seal portion, facing the space of the seal portion at which the opening member is disposed. The opening member may be polygon shaped. Alternatively, the opening member may be triangular with one side facing the interior side of the seal portion at which the opening member is disposed, with the angle opposite the side being preferably in the range of 30 to 80°. Also, the opening member may be circular, elliptical or semi-circular.

The thickness of the opening member in a direction perpendicular to the seal portion may be less than half of the width of the seal portion at which the opening member is disposed.

Also, the opening member may be arranged under a half of the width of the seal portion at which the opening member is disposed.

The positive and negative electrode terminals may be spaced a predetermined distance apart from each other and exposed outside the pouch casing via the seal portion, and the opening member may be interposed between the positive and negative electrode terminals of the seal portion.

The pouch casing may have an adhesion layer made of a resin material on the internal face of the seal portion, and the opening member may be made of a resin material having a lower melting point than the melting point of the adhesion layer. Here, the opening member may be made of a polyethylene resin material.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Embodiments of the present invention are described below with reference to the appended drawings.

Figure 1:
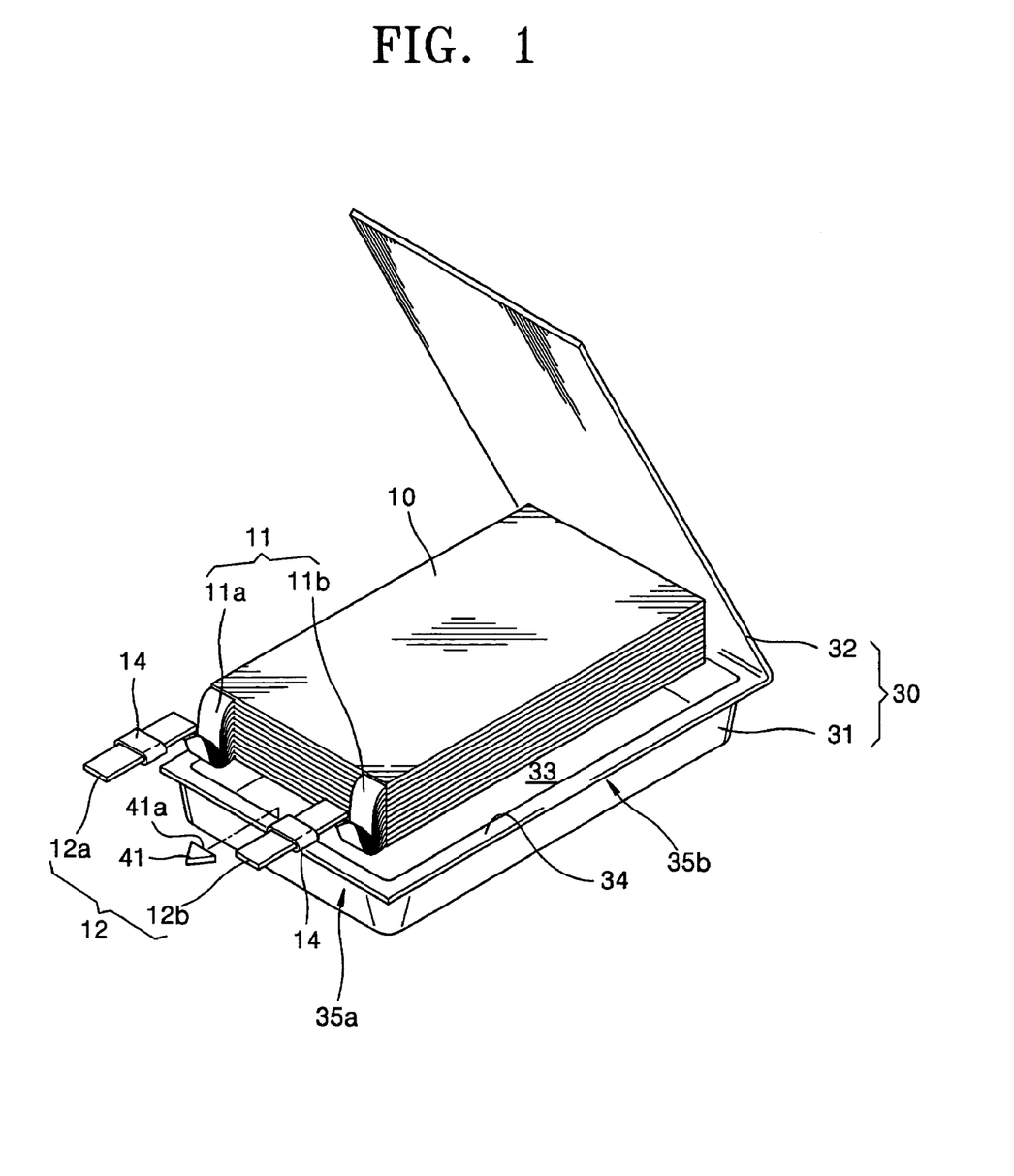
FIG. 1 is an extracted perspective view of a pouch type secondary battery according to an embodiment of the present invention.
Figure 2:
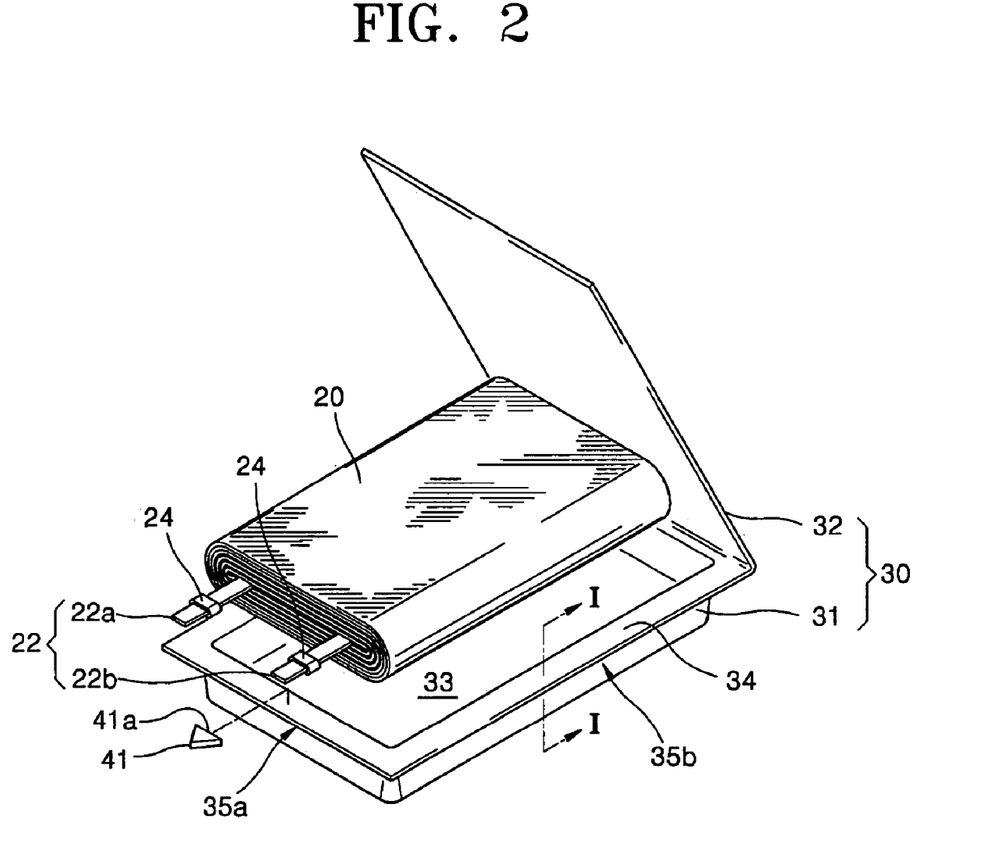
FIG. 2 is an extracted perspective view of a pouch type secondary battery according to another embodiment of the present invention.

FIG. 1 is an extracted perspective view of a pouch type secondary battery according to an embodiment of the present invention. In FIG. 1, the pouch type secondary battery according to the present invention includes an electrode assembly 10 having positive and negative electrode plates with a separator interposed therebetween, and a pouch casing 30 in which the electrode assembly 10 is housed. The electrode assembly 10 shown in FIG. 1 is a stacked electrode assembly in which positive and negative electrode plates are stacked with a separator interposed therebetween, but is not limited thereto. As shown in FIG. 2, the electrode assembly according to the present invention may be a jelly-roll type electrode assembly 20 in which positive and negative electrode plates are wound with a separator interposed therebetween. The jelly roll type electrode assembly may be applied to all embodiments of the present invention, which are described below.

The electrode assembly 10 shown in FIG. 1 is typically used in polymer lithium secondary batteries. The positive electrode plate is formed by thermally compressing a positive electrode sheet containing a positive electrode active material comprising lithium oxide on at least one plane of a positive electrode current collector made of a metallic foil, e.g., an aluminum foil. The negative electrode plate is formed by thermally compressing a negative electrode sheet containing a negative electrode active material comprising a carbon material on at least one plane of a negative electrode current collector made of a metallic foil, e.g., a copper foil. The electrode assembly 10 is housed in the pouch casing 30, and an electrolytic solution is impregnated into the electrode assembly 10, followed by sealing the pouch casing 30, thus manufacturing a secondary battery.

In the stacked electrode assembly 10, as shown in FIG. 1, an electrode tap 11 is drawn from each of the electrode plates, and an electrode lead portion 12 is welded to the electrode tap 11. In detail, a positive electrode tap 11a is drawn from the positive electrode plate and a positive electrode lead 12a is welded to the positive electrode tap 11a. Also, a negative electrode tap 11b is drawn from the negative electrode plate and a negative electrode lead 12b is welded to the negative electrode tap 11b. A polymeric protective tape 24 is adhered to each of the electrode leads 12a and 12b. The positive and negative electrode leads 12a and 12b form electrode terminals exposed outside the pouch casing 30 even after being sealed.

As shown in FIG. 2, the jelly-roll type electrode assembly 20 according to another embodiment of the present invention is typically used in lithium ion batteries and is configured such that the separator (not shown) is interposed between the positive and negative electrode plates (not shown) and the resultant product is wound. The positive electrode plate is formed by coating a positive electrode composite slurry containing a positive electrode active material, e.g., lithium oxide, on a positive electrode current collector made of a metallic foil, e.g., an aluminum foil. The negative electrode plate is formed by coating a negative electrode composite slurry containing a negative electrode active material, e.g., a carbon material, on a negative electrode current collector made of a metallic foil, e.g., a copper foil. The jelly-roll type electrode assembly 20 is housed in the pouch casing 30 and sealed, excluding sealing of an electrolytic solution injection hole, followed by injecting an electrolytic solution through the electrolytic solution injection hole and sealing the electrolytic solution injection hole, thus manufacturing a secondary battery.

An electrode tap 22 is drawn from each of the electrode plates of the jelly-roll type electrode assembly 20. In detail, a positive electrode tap 22a is drawn from the positive electrode plate and a negative electrode tap 22b is drawn from the negative electrode plate. Likewise in the stacked electrode assembly 10, a polymeric protective tape 24 may be adhered to each of-the electrode taps 22a and 22b. The positive and negative electrode taps 22a and 22b are exposed outside the pouch casing 30 to be positive and negative terminals, respectively.

Figure 5:
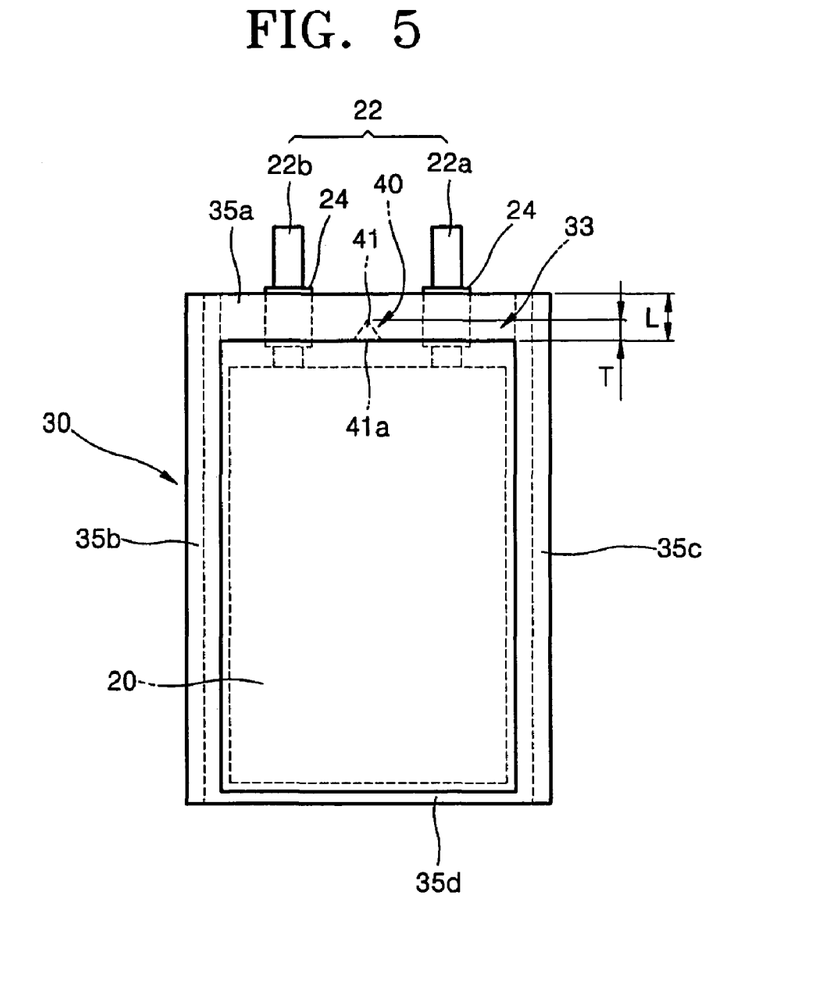
FIG. 5 is a plan view of the pouch type secondary battery shown in FIG. 2.

As described above, the stacked electrode assembly 10 or the jelly-roll type electrode assembly 20, as shown in FIGS. 1 and 2, is housed in the pouch casing 30 having a space 33 inside. The pouch casing 30 has a case body 31 recessed to provide the space 33, and a pouch cover 32 which covers the case body 31 to seal the space 33. One end of the pouch cover 32 extends from the case body 31. In the case body 31, a flange 34 at which the case body 31 is sealed with the pouch cover 32, is formed around the space 33, and the pouch cover 32 is coupled to the flange 34 of the case body 31, thus sealing the space 33. As one end of the pouch cover 32 is connected to the case body 31, the space 33 is sealed with three side seal portions 35a, 35b and 35c, as shown in FIG. 5. However, the shape of such a pouch case is not limited to that described above. Although not shown, an electrode assembly may be housed in a pouch case with an opening at its one plane, and the opened plane is then sealed. In this case, there is one seal portion formed. The following description is given with reference to the pouch case, specifically the pouch case having a case body and a pouch cover.

Figure 3:
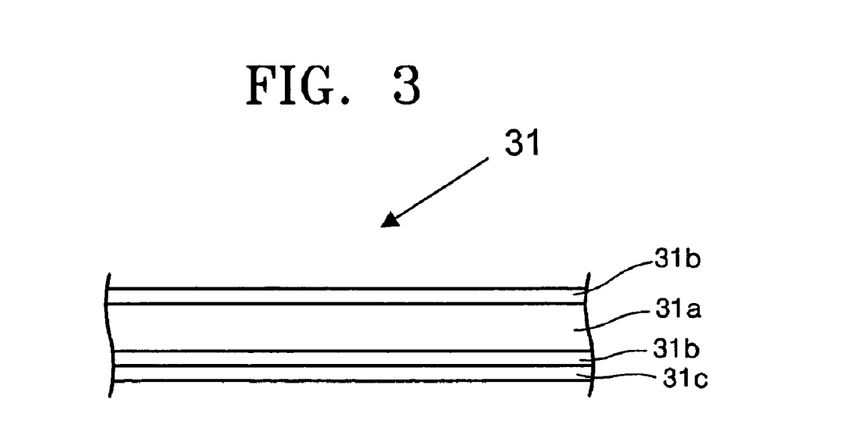
FIG. 3 is a cross-sectional view of FIG. 2, taken along the line I—I.

The pouch casing 30 of the pouch type secondary battery may be formed of laminates having a metallic material and a resin material. As shown in FIG. 3, the case body 31 may be formed of compressed composite materials such that a thermal adhesion layer 31b is formed of denatured polypropylene, e.g., cast polypropylene (CPP), on the inner face of a foil 31a made of a metal, e.g., Al, and a resin material 31c made of a polymer resin, e.g., nylon or polyethyleneterephthalate (PET), is formed on the outer face of the foil 31a with the thermal adhesion layer 316 interposed between the foil 31a and the resin material 31c. The pouch cover 32 has the same structure as that of the case body 31. Thus, the pouch casing 30 can be sealed by thermal compression in a state in which the thermal adhesion layers 31b are contacted with each other.

The pouch casing 30 having the above-described configuration and material has three seal portions 35a, 35b and 35c, as shown in FIG. 5. The first seal portion 35a is disposed opposite to a portion 35d, at which the case body 31 and the pouch cover 32 are connected to each other, and positive and negative electrode taps 22a and 22b of the electrode assembly 20 are exposed thereat. The second and third seal portions 35b and 35c formed at either side of the first seal portion 35a are folded along the dotted line shown in FIG. 5, thus reducing the size of a battery. FIG. 5 is a plan view of the pouch type secondary battery shown in FIG. 2, which is substantially the same as that shown in FIG. 1. For the sake of convenient explanation, pouch type secondary batteries having the jelly-roll type electrode assembly 20 shown in FIG. 2 are described below with reference to various embodiments. However, pouch type secondary batteries having a stacked electrode assembly 10 may be arranged in a similar fashion.

As shown in FIGS. 2 and 5, at least one opening member 41 is disposed in at least one of the seal portions 35a, 35b and 35c of the pouch casing 30, thus forming a safety vent 40. According to an embodiment of the present invention, the opening member 41 may be disposed between the positive and negative electrode taps 22a and 22b of the first seal portion 35a, but is not limited thereto. As will be described later, the opening member 41 may be formed at a lateral face of the pouch casing 30, that is, at the second or third seal portion 35b or 35c. Although not shown, the opening member 41 may be formed at a portion between each of the respective seal portions, that is, at a corner of the pouch casing 30. The opening member 41 is preferably formed at the center of each seal portion because the center of the seal portion is exposed to the most severe pressure and stress when the internal temperature and the pressure of the battery are elevated.

Figure 4:
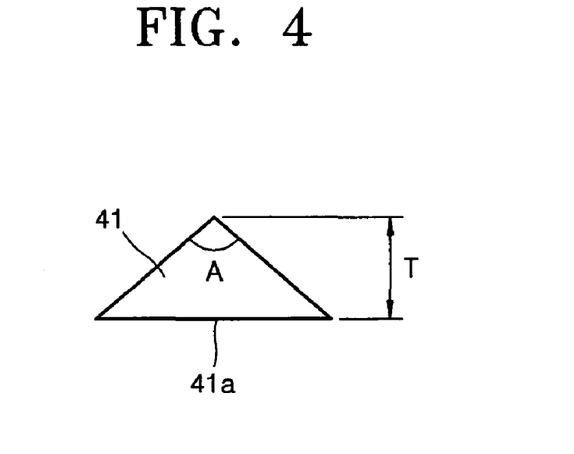
FIG. 4 is a plan view of an opening member shown in FIG. 2.

In the present invention, the opening member 41 is made of a resin material having a lower melting point than the seal portion 35a at which the opening member 41 is disposed. This arrangement allows the opening member 41 to be melted earlier than the seal portion 35a of the pouch case 30 when the temperature of the battery is elevated, thus removing the sealing thereat. Hence, in the case where the pouch case 30 includes the thermal adhesion layers made of CPP and the seal portions are formed from the thermal adhesion layers connected to each other by thermal compression, the opening member 41 may be formed of a polyethylene (PE) resin material having a lower melting point than CPP. Although the melting point of PE varies according to the density, the PE used to form the opening member 41 generally has a lower melting point than the polypropylene forming a thermal adhesion layer. This arrangement may also be applied to all embodiments of the present invention which are explained below The opening member 41 may be polygon shaped, preferably in the shape of a triangle, as shown in FIG. 4. Here, at least one side of the triangular opening member 41 is flat to provide a first end 41a. As shown in FIGS. 2 and 5, the opening member 41 is disposed such that the first end 41a faces the interior of the pouch casing 30, that is, the space 33, at the first seal portion 35a. A portion where the sealing of the first seal portion 35a is removed, is flat with respect to the space 33, the portion produced when the opening member 41 is melted, thus promoting rupturing of the first seal portion 35a thereat.

As shown in FIG. 4, the opening member 41 promotes rupturing of the first seal portion 35a by adjusting the angle A that is opposite the first end 41a. Generally, the angle A is in the range of 30 to 80°, for more effectively rupturing of the first seal portion 35a.

The opening member 41, as shown in FIG. 5, may be disposed such that its first end 41a is connected to an internal end of the first seal portion 35a, that is, an end facing the space 33 of the first seal portion 35a, which makes the opening member 41 easily receive heat from the space 33 inside the battery and facilitates the rupture of the opening member 41 when the first end 41a is melted.

Also, the opening member 41 may be disposed at a position that is less than half of the width L of the first seal portion 35a. If the opening member 41 occupies too much of a portion of the first seal portion 35a, the adhesive strength at an area where the opening member 41 is disposed may be considerably weakened.

As shown in FIG. 5, the height of the opening member 41 from the first end 41a, that is, the thickness T of the opening member 41 in a direction perpendicular to the first seal portion 35a, is less than half of the width L of the first seal portion 35a. The first seal portion 35a is also used for adjusting the adhesive strength at an area where the opening member 41 is disposed.

Figure 6:
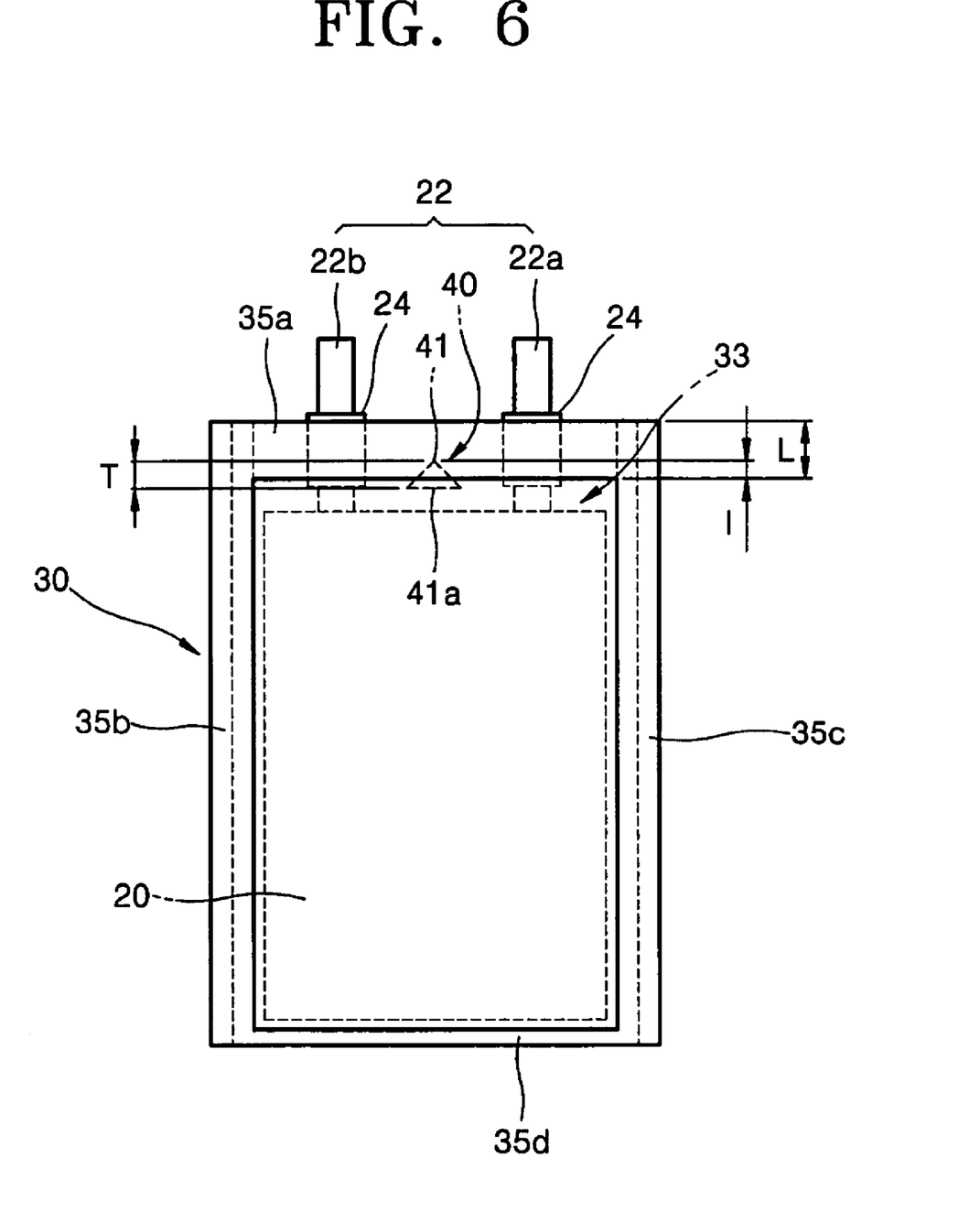
FIGS. 6 through 13 are plan views of pouch type secondary batteries according to other embodiments of the present invention.

The above-described opening member 41 may be modified in various manners in view of location, size and shape. As shown in FIG. 6, the height of the opening member 41, that is, the thickness thereof in a direction perpendicular to the first seal portion 35a, may be greater than half of the width L of the first seal portion 35a. In this case, however, the opening member 41 may be disposed under an area corresponding to half of the length L of the first seal portion 35a. As shown in FIG. 6, the first end 41a of the opening member 41 may outreach the first seal portion 35a to extend toward the space 33.

Figure 7:
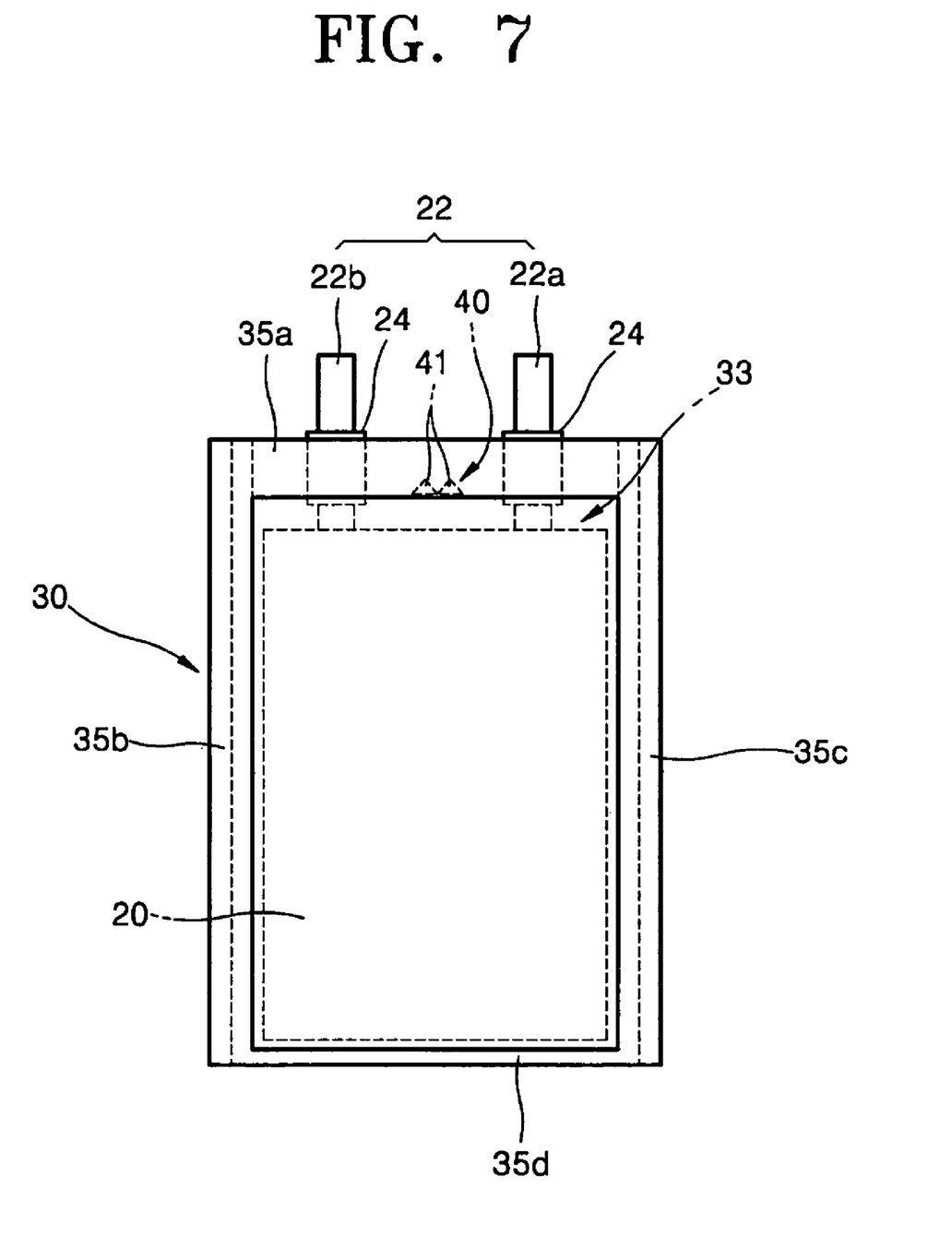

In the case of forming small opening members, as shown in FIG. 7, two or more opening members 41 are arranged, thus forming a breaking portion having a predetermined width when melted.

Figure 8:
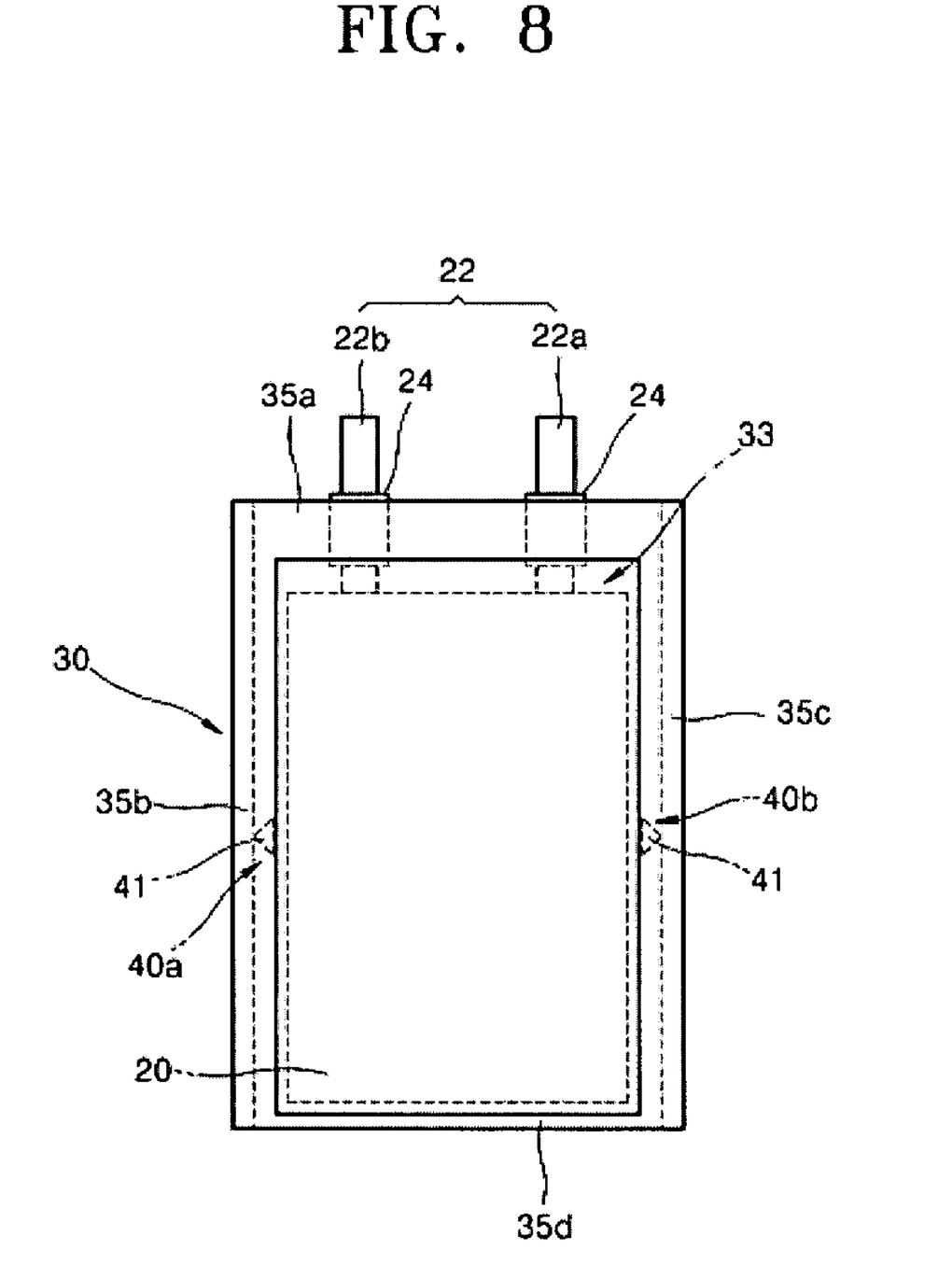

Referring to FIG. 8, the opening member may be provided in the second and third seal portions 35b and 35c as well as in the first seal portion 35a. The second and third seal portions 35b and 35c are folded one or more times along dotted lines shown in FIG. 8. In this case, the opening member 41 is preferably disposed inward with respect to the folded lines. The same thicknesses and locations as described above are applied to opening members provided at lateral seal portions, that is, the second and third seal portions 35b and 35c. The opening members 41 disposed at lateral sealing portions correspond to the first and second safety vents 40a and 40b formed at lateral faces of the electrode assembly 20, respectively.

Figure 9:
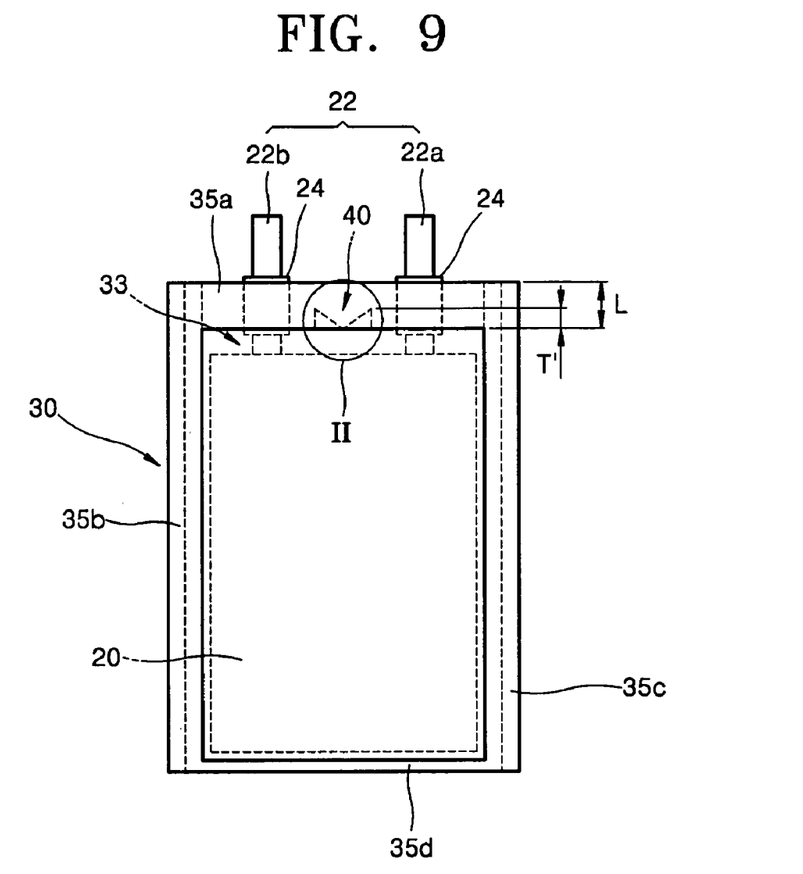
Figure 10:
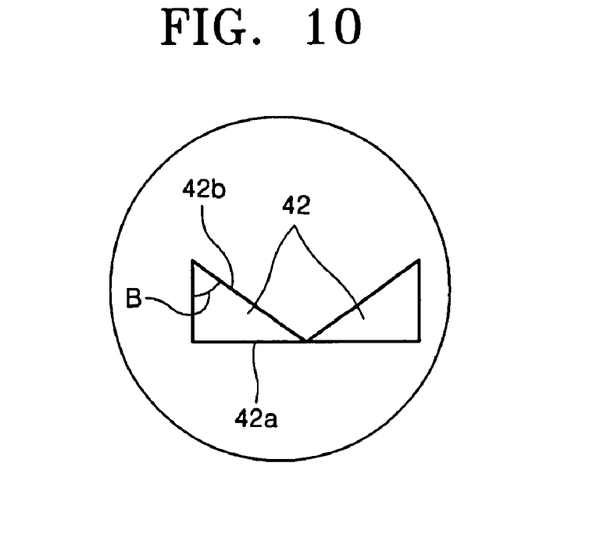

Although the above-described opening members are shaped to form a triangle in which the lengths of two sides are equal, the shape of the opening member according to the present invention is not limited thereto. As shown in FIGS. 9 and 10, the opening member may be arranged such that the longest side 42b does not face the space 33. In this case, however, the first end 42a facing the space 33 is preferably flat, and the angle B opposite to the first end 42a is preferably 30 to 80°. As described above, the height of the opening member 42, that is, the thickness T of the opening member 42 in a direction perpendicular to the first seal portion 35a, is less than half of the width L of the first seal portion 35a. The opening member 41 may be disposed under an area corresponding to half of the width L of the first seal portion 35a. As shown in FIGS. 9 and 10, two or more opening members 42 may be serially disposed to promote rupturing thereat.

Figure 11:
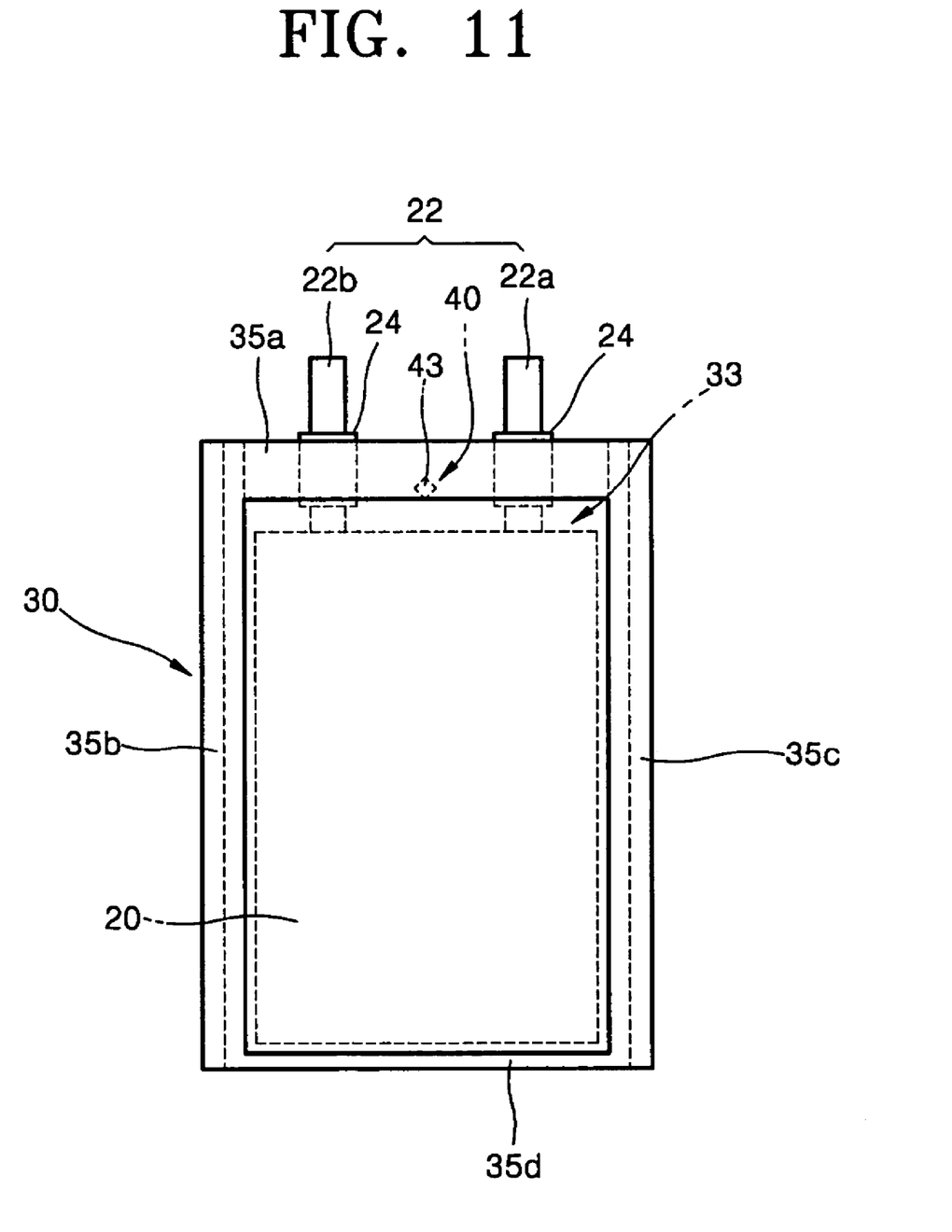
Figure 12:
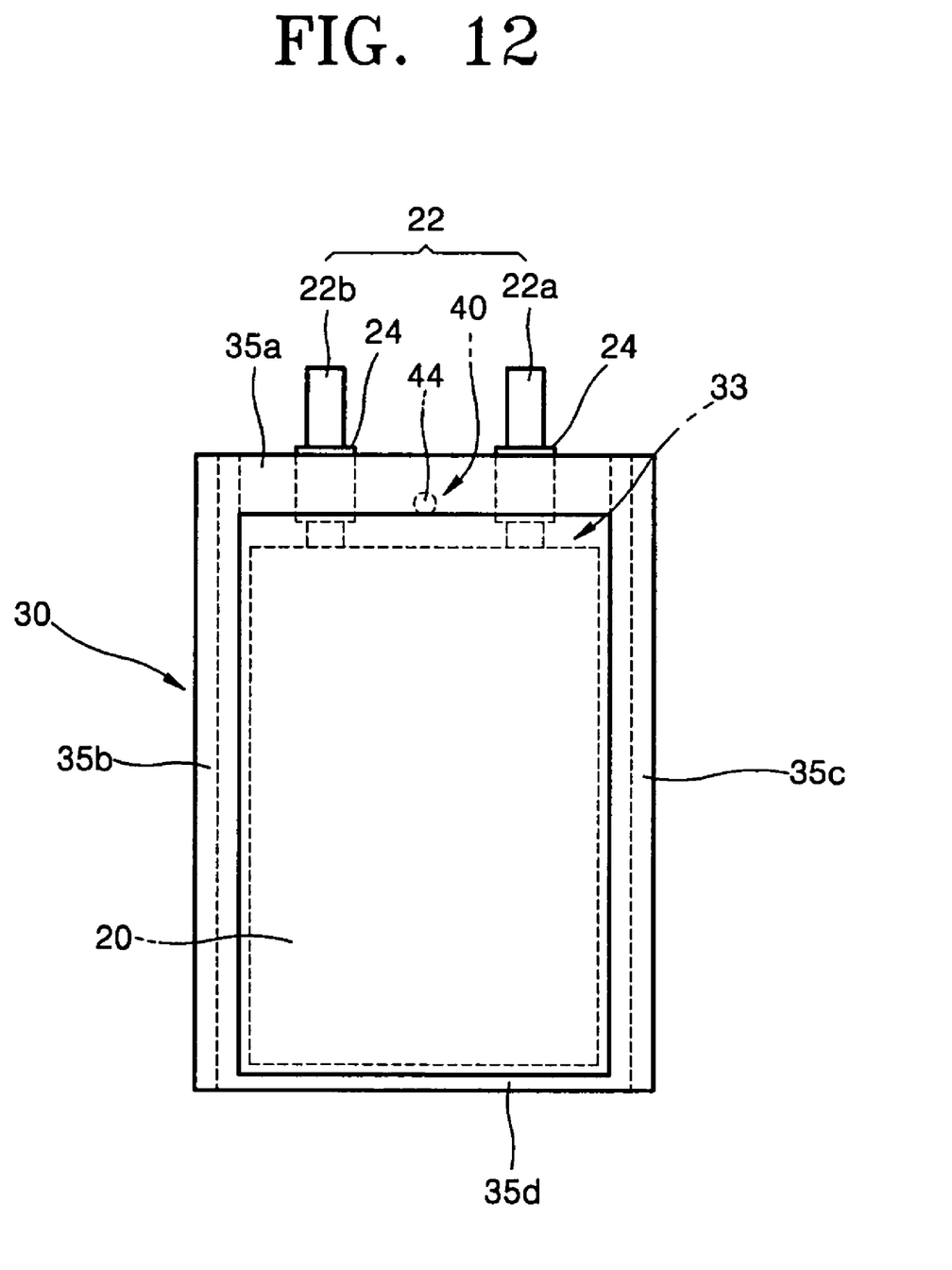
Figure 13:
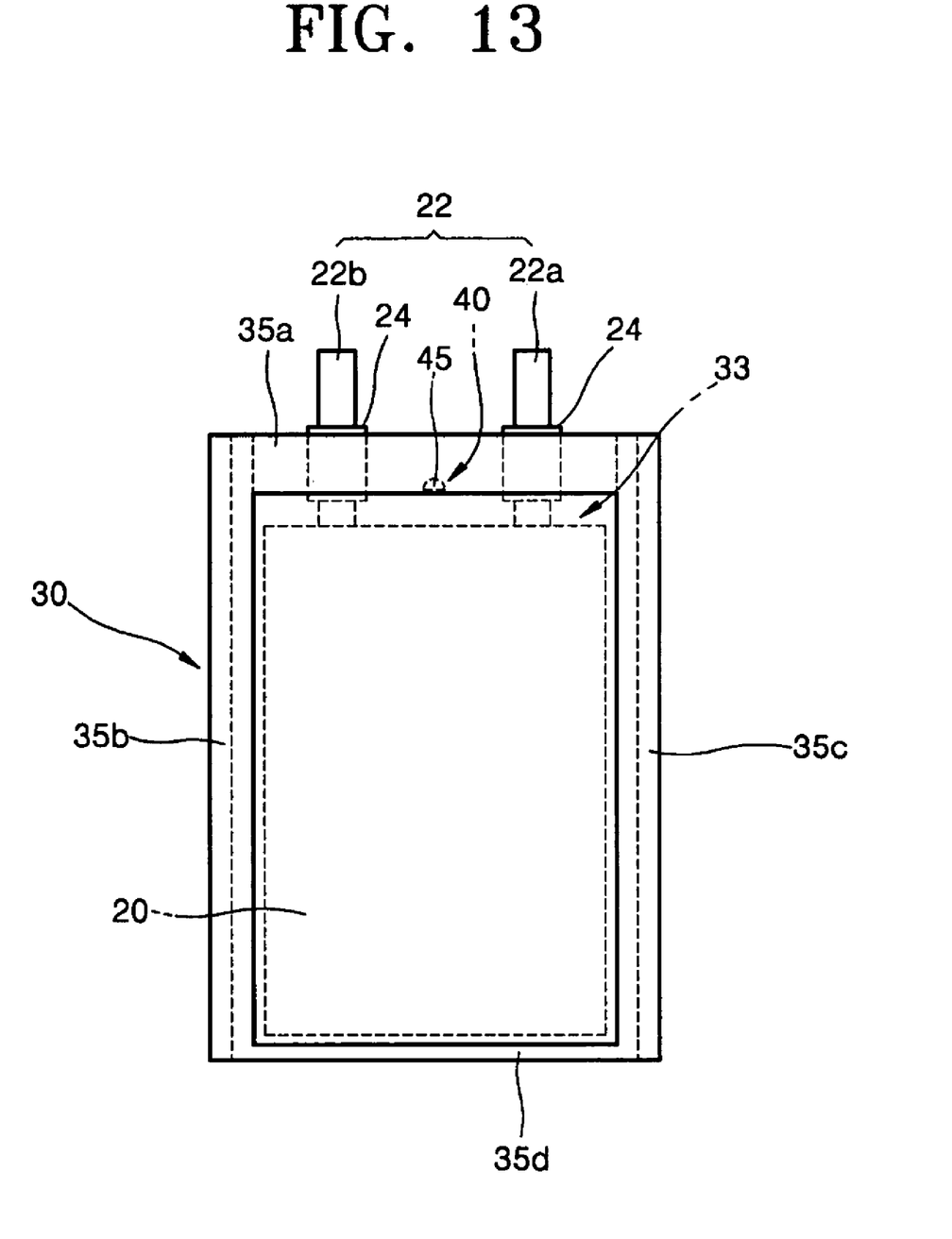

The invention has been, for convenience, described with regard to a safety vent using a triangular opening member, but it is not so limited. As shown in FIG. 11, the safety vent 40 according to the present invention may have a rhombic opening member 43, and may have various shapes in other types of opening members. As shown in FIG. 12, a circular or elliptical opening member 44 may be provided. As shown in FIG. 13, a semi-circular opening member 45 may be provided.

Next, the operation of the opening member of the pouch type secondary battery according to the present invention is described. By way of example, pouch type secondary batteries having the opening members shown in FIGS. 2 and 5 are now described.

Figure 14:
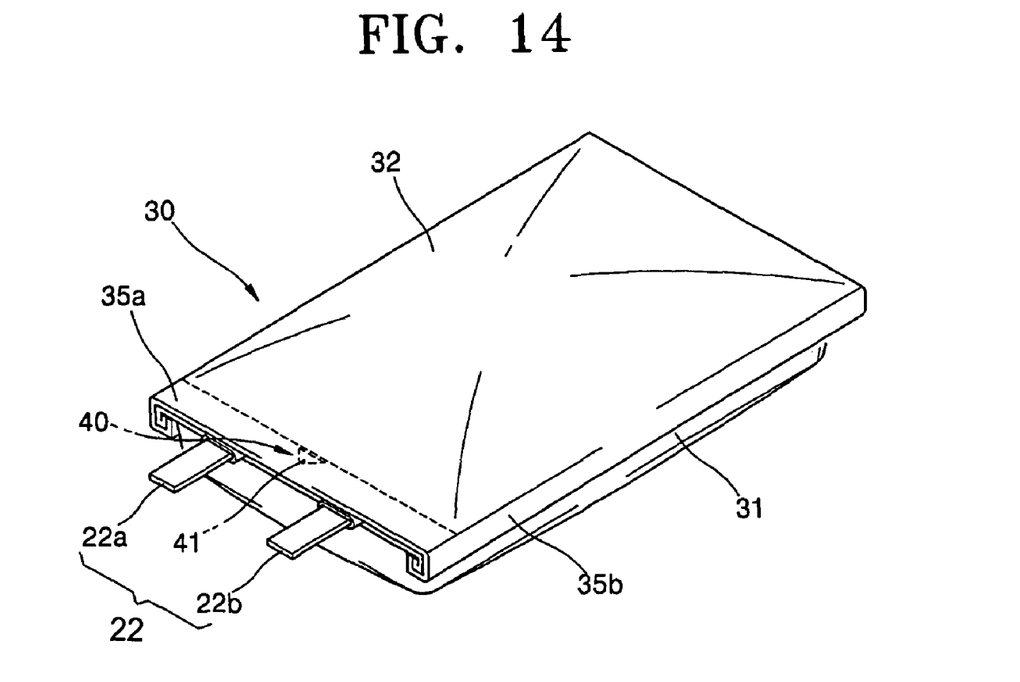
FIGS. 14 and 15 illustrate the operation state of the pouch type secondary battery shown in FIG. 2.

When the pouch type secondary batteries shown in FIGS. 2 and 5 are overcharging/overdischarging, or exposed to high temperature, gas is produced inside the batteries, resulting in volumetric expansion of the batteries, as shown in FIG. 14. Swelling of an electrolytic solution further increases such volumetric expansion of the batteries. If expansion of a battery is continued, fire and explosion may occur inside the battery. Thus, it is necessary to exhaust the internal gas of the battery before fire and explosion occur.

Figure 15:
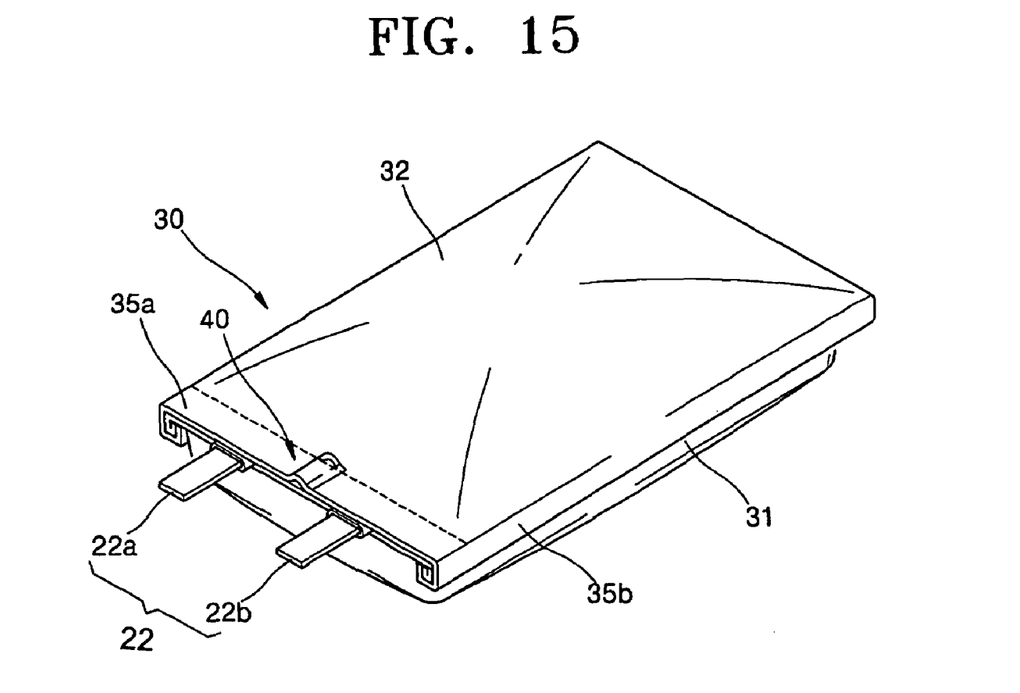

As described above, the internal pressure and temperature of a battery increase when gas is released inside the battery. According to the present invention, if the internal temperature of the battery rises to a predetermined temperature to reach a melting point of the opening member 41 of the safety vent 40, the opening member 41 is melted and a space occupied by the opening member 41 becomes empty. As the space of the opening member 41 is unoccupied, the adhesion width of the first seal portion 35a in the safety vent 40 is thinner than that of the other portion, and the adhesion strength thereof is lowered. Accordingly, as shown in FIG. 15, a portion corresponding to the space occupied by the opening member 41 in the safety vent 40 ruptures, and the internal gas of the battery is exhausted through the ruptured portion, thus preventing fire and explosion of the battery.

The above-described opening member interposed between adhesion layers of a pouch casing is made of a different material from the material used in the adhesion layers. Thus, interposing the opening member between the adhesion layers weakens the adhesion strength of a seal portion having the opening member. Accordingly, the seal portion having the opening member ruptures more easily than the other portions, thus preventing explosion and fire of the battery.

As described above, the present invention has, among others, the following advantages.

First, since the thermal stability of a battery is improved, it is possible to prevent explosion and fire of the battery during use under a high temperature condition or thermal runaway of the battery.

Second, battery safety can be ensured even when the internal gas pressure is excessively high due to swelling during overcharging, internal short-circuit, or the like.

Third, since the battery safety is effectuated by a simple structure, the manufacturability of the battery is enhanced.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. A pouch type secondary battery comprising:
   an electrode assembly having positive and negative electrode plates with a separator interposed therebetween, and positive and negative electrode terminals extending from the positive and negative electrode plates, respectively;
   a pouch casing having a space in which the electrode assembly is housed to be sealed, a seal portion provided at the periphery of the space, and at least one of the positive and negative electrode terminals exposed to the seal portion; and
   at least one opening member disposed at a position of the seal portion and made of a resin material having a lower melting point than the seal portion of the pouch casing, wherein a thickness of the opening member in a direction perpendicular to the seal portion is less than a half of a width of the seal portion in the same direction at the position of the seal portion where the opening member is disposed.

2. The pouch type secondary battery according to claim 1, wherein the opening member has a flattened first end, the flattened first end facing the space of the pouch casing.

3. The pouch type secondary battery according to claim 2, wherein the first end is connected to an internal end of the seal portion facing the space of the seal portion at which the opening member is disposed.

4. The pouch type secondary battery according to claim 1, wherein the opening member is polygon shaped.

5. The pouch type secondary battery according to claim 4, wherein the opening member is triangular, wherein one side of a triangle faces an interior side of the seal portion at which the opening member is disposed, and an angle opposite the side is in a range of 30 to 80°.

6. The pouch type secondary battery according to claim 1, wherein the opening member is circular, elliptical or semi-circular.

7. The pouch type secondary battery according to claim 1, wherein the positive and negative electrode terminals are spaced a predetermined distance apart from each other to be exposed outside the pouch casing via the seal portion, and the opening member is interposed between the positive and negative electrode terminals of the seal portion.

8. The pouch type secondary battery according to claim 1, wherein the pouch casing has an adhesion layer made of a resin material on an internal face of the seal portion, and the opening member is made of a resin material having a lower melting point than a melting point of the adhesion layer.

9. The pouch type secondary battery according to claim 8, wherein the opening member is made of a polyethylene resin material.

10. A pouch type secondary battery hiving a pouch seal portion, comprising:

at least one opening member of the pouch seal portion at a position along the pouch seal portion, the at least one opening member having a triangle shape and comprising a resin material having a lower melting point than a melting point of the pouch seal portion, wherein a thickness of the opening member in a direction perpendicular to the seal portion is less than a half of a width of the seal portion in the same direction at the position of the seal portion where the opening member is disposed.

11. The pouch type secondary battery of claim 10, wherein one side of the triangle shape faces an interior side of the pouch seal portion at which the opening member is disposed, and an angle opposite the side is in a range of 30 to 80°.

12. A pouch type secondary battery including an electrode assembly having positive and negative electrode plates with a separator interposed therebetween, and positive and negative electrode terminals extending from the positive and negative electrode plates, respectively, the battery comprising:

a casing having an interior in which the electrode assembly is housed;

a seal portion provided at the periphery of the casing to seal the casing, at least one of the positive and negative electrode terminals being exposed to the seal portion; and a member, disposed at a positioning along the seal portion, made of a material having a lower melting point than that of the seal portion such that the member melts when a temperature of the interior of the casing increases beyond the melting point of the member material such that the seal portion is unable to seal the casing, wherein a thickness of the member in a direction perpendicular to the seal portion is less than a half of a width of the seal portion in the same direction at the position of the seal portion where the opening member is disposed.

13. A pouch type secondary battery having a pouch seal portion, comprising:

a member of the pouch seal portion at a position along the pouch seal portion, the member having a triangle shape and comprising a resin material having a lower melting point than a melting point of the pouch seal portion such that the member melts when a temperature of the interior of the battery increases beyond the melting point of the member material such that the pouch seal portion is unable to seal the casing, wherein a thickness of the member in a direction perpendicular to the seal portion is less than a half of a width of the seal portion in the same direction at the position of the seal portion where the opening member is disposed.

* * * * *

UNITED STATES PATENT AND TRADEMARK OFFICE
CERTIFICATE OF CORRECTION

PATENT NO.        : 7,122,276 B2                                           Page 1 of 1
APPLICATION NO. : 10/601848
DATED             : October 17, 2006
INVENTOR(S)       : Chang-Il Gu It is certified that error appears in the above-identified patent and that said Letters Patent is hereby corrected as shown below:

Claim 12
Column 10, line 7, change "positioning" to -- position --

Signed and Sealed this

Twentieth Day of February, 2007

JON W. DUDAS
*Director of the United States Patent and Trademark Office*